Patented May 6, 1941

2,241,200

UNITED STATES PATENT OFFICE 2,241,200

PROCESS OF PRODUCING CHLORINATED ETHERS

Heinrich Hopff, Ludwigshafen - on - the - Rhine, Germany, assignor, by mesne assignments, to General Aniline & Film Corporation, New York, N. Y., a corporation of Delaware No Drawing. Application February 25, 1939, Serial No. 258,458. In Germany March 4, 1938

6 Claims. (Cl. 260—611)

The present invention relates to chlorinated ethers and a process of producing same.

I have found that chlorinated ethers corresponding to the general formula

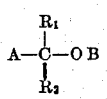

wherein A stands for benzene or a naphthalene nucleus, $R_1$ and $R_2$ for hydrogen or chlorine or a beta-chloralkoxy group and B for a beta-chloralkyl group, can be obtained by causing alkylene-oxides to react with compounds of the general formula

wherein A stands for benzene or a naphthalene nucleus and $R_1$ and $R_2$ for hydrogen or chlorine.

The reaction, for instance if benzylchloride and ethyleneoxide are used as starting materials, proceeds as follows:

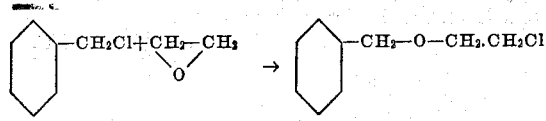

As halogen compounds corresponding to the second formula mentioned above there may be mentioned for example benzylchloride, benzal chloride, benzo trichloride or alpha-chloralkyl-naphthalenes.

Among olefine oxides there may be mentioned ethylene, propylene, butylene, phenyl-ethylene and butadiene oxides.

The initial materials, in about equimolecular proportions, are heated in a closed vessel until the completion of the reaction, for example at from 100° to 200° C. The chlorine compound may also be heated to the reaction temperature, if desired after dilution with a solvent, the olefine oxide then being led in in the vapor state or allowed to drop in in the liquid state.

The reaction may be accelerated by catalysts, such as metallic copper, copper salts, small amounts of caustic alkalies, such as sodium or potassium hydroxide, or organic bases, such as piperidine.

The reaction mixture is preferably worked up by distillation. The ethers containing chlorine obtained are, depending on the initial materials, from water-clear to pale yellowish oils having a pleasant odor or solid, salve-like substances.

When starting from compounds having two or more chlorine atoms, the olefine oxide may enter into the molecule two or more times.

The following examples will further illustrate how the said invention may be carried out in practice but the invention is not restricted to these examples. The parts are by weight.

Example 1

126 parts of benzyl chloride, 50 parts of ethylene oxide and 0.5 part of cupric chloride are heated to 160° C. for 10 hours in a closed vessel. The mixture is then distilled under reduced pressure. There are obtained 130 parts of a colorless oil having a pleasant odor which passes over between 90 and 95° C. under a pressure of 3 millimeters (mercury gauge). According to analysis, which gives the formula $C_9H_{11}OCl$, and the course of the reaction, the product is benzyl-omega-chlorethyl ether. There are also formed small amounts of an oil passing over between 100° and 150° C. at a pressure of 2 millimeters (mercury gauge) in which a hydroxyethyl derivative of the said chlorether is probably contained.

By using the equivalent amount of propylene oxide instead of ethylene oxide, benzyl-chlorpropyl ether which boils at from 110° to 120° C. under a pressure of 3 millimeters (mercury gauge) is obtained.

Example 2

A mixture of 81 parts of benzal chloride and 45 parts of ethylene oxide is heated at 120° C. for 10 hours in a closed vessel. The reaction mixture is then distilled under reduced pressure. 85 parts of a pale yellowish colored oil having a pleasant odor and boiling at from 120 to 130° C. at a pressure of 2 millimeters (mercury gauge) are obtained; according to analysis and the course of the reaction it is:

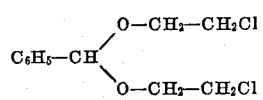

Propylene oxide may be reacted with benzal chloride in the same way.

Example 3

200 parts of benzotrichloride are heated to 100° C. with 50 parts of ethylene oxide for 10 hours. By working up in the abovementioned manner, 180 parts of an oil boiling between 95° and 105° C. under a pressure of 3 millimeters (mercury gauge) are obtained: it probably has the constitution:

$$C_6H_5—CCl_2—O—CH_2—CH_2Cl$$

By using 100 or 150 parts of ethylene oxide instead of 50 parts, two or three molecules of this oxide enter into the molecule.

Example 4

A mixture of 176 parts of omega-chlormethyl-naphthalene and 45 parts of ethylene oxide is heated in a closed vessel at 150° C. for 10 hours while stirring. The reaction product is then distilled under reduced pressure. There are obtained 150 parts of an oil which passes over between 190 and 200° C. under a pressure of 2 millimeters (mercury gauge). According to analysis the new compound has the formula $$C_{10}H_7CH_2—O—CH_2.CH_2Cl$$

What I claim is:

1. A process of producing chlorinated ethers which comprises heating compounds of the general formula

wherein A stands for an aromatic radical selected from the class consisting of benzene and naphthalene, R₁ and R₂ for a member of the class consisting of hydrogen and chlorine, with alkylene-oxides.

2. A process of producing chlorinated ethers which comprises heating compounds of the general formula

wherein A stands for an aromatic radical selected from the class consisting of benzene and naphthalene, R₁ and R₂ for a member of the class consisting of hydrogen and chlorine, with alkylene-oxides in the presence of small amounts of a caustic alkali as catalyst.

3. A process of producing chlorinated ethers which comprises heating compounds of the general formula

wherein A stands for an aromatic radical selected from the class consisting of benzene and naphthalene, R₁ and R₂ for a member of the class consisting of hydrogen and chlorine, with alkyleneoxides in the presence of a copper salt.

4. The ether of the formula

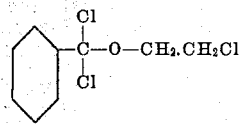

being a colorless oil boiling at from 95 to 105° C. under a reduced pressure of 3 millimeters mercury gauge.

5. A chlorinated ether corresponding to the general formula

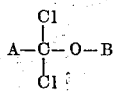

wherein A stands for an aromatic radicle selected from the class consisting of benzene and naphthalene and B for a beta-chloralkyl group containing from 2 to 4 carbon atoms.

6. A process of producing chlorinated ethers which comprises heating compounds of the general formula:

wherein A stands for an aromatic radical selected from the class consisting of benzene and naphthalene, R₁ and R₂ for a member of the class consisting of hydrogen and chlorine, with alkylene oxides in the presence of small amounts of a heterocyclic base as catalyst.

HEINRICH HOPFF.